(12) United States Patent
Specht (10) Patent No.: US 11,440,501 B2
(45) Date of Patent: Sep. 13, 2022

(54) INTEGRATED MOTOR RETRACTOR (IMR) WITH MOTION PROFILES

(71) Applicant: KEY SAFETY SYSTEMS, INC., Auburn Hills, MI (US)

(72) Inventor: Martin Specht, Feldafing (DE)

(73) Assignee: KEY SAFETY SYSTEMS, INC., Auburn Hills, MI (US)

( * ) Notice: Subject to any disclaimer, the term of this patent is extended or adjusted under 35 U.S.C. 154(b) by 29 days.

(21) Appl. No.: 16/637,104

(22) PCT Filed: Aug. 7, 2017

(86) PCT No.: PCT/IB2017/000923
§ 371 (c)(1),
(2) Date: Feb. 6, 2020

(87) PCT Pub. No.: WO2019/030545
PCT Pub. Date: Feb. 14, 2019

(65) Prior Publication Data
US 2020/0247353 A1 Aug. 6, 2020

(51) Int. Cl.
*B60R 22/46* (2006.01)
*B60R 22/34* (2006.01)
(Continued)

(52) U.S. Cl.
CPC .......... *B60R 22/3413* (2013.01); *B60R 22/46* (2013.01); *B60R 22/48* (2013.01);
(Continued)

(58) Field of Classification Search
CPC ......... B60R 22/34; B60R 22/46; B60R 22/48; B60R 22/3413; B60R 2022/287; B60R 2022/288
See application file for complete search history.

(56) References Cited

U.S. PATENT DOCUMENTS 6,290,159 B1 9/2001 Specht et al.
6,676,056 B2 * 1/2004 Peter ...................... B60R 22/44
242/374
(Continued)

FOREIGN PATENT DOCUMENTS

DE 20013541 U1 10/2000
DE 102009023625 B4 9/2014
(Continued)

OTHER PUBLICATIONS

International Search Report and Written Opinion in PCT/IB017/000923, dated Nov. 17, 2017. 13 pages.
(Continued)

*Primary Examiner* — Sang K Kim
(74) *Attorney, Agent, or Firm* — Meunier Carlin & Curfman LLC (57) ABSTRACT

The invention relates to an active restraint system (1), comprising a seat belt retractor (3), having a frame (2) and a belt reel (4) with a belt webbing (10) wound thereon and rotatable supported by the frame (2) for allowing winding and unwinding the belt webbing (10). An electric disc motor (28) comprising a rotor (30) and a stator (32) is attached to the belt reel (4). The rotor (30) is directly attached by an attachment (31) to the belt reel (4). The restraint system further comprises a control unit (40) connected to the disc motor (28) and adapted to control the disc motor (28) to drive the belt reel (4) in accordance with a determined belt motion profile.

20 Claims, 9 Drawing Sheets

(51) Int. Cl.
*B60R 22/48* (2006.01)
*B60R 22/28* (2006.01)

(52) U.S. Cl.
CPC ... *B60R 2022/287* (2013.01); *B60R 2022/288* (2013.01); *B60R 2022/3402* (2013.01); *B60R 2022/3427* (2013.01)

(56) References Cited

U.S. PATENT DOCUMENTS

| | | | |
|---|---|---|---|
| 2001/0037907 A1* | 11/2001 | Peter | B60R 22/44 180/268 |
| 2006/0113418 A1* | 6/2006 | Nomura | B60R 22/44 242/374 |
| 2009/0173816 A1* | 7/2009 | Odate | B60R 22/46 242/374 |
| 2015/0122931 A1* | 5/2015 | Specht | B60R 22/3413 242/379.1 |

FOREIGN PATENT DOCUMENTS

| | | |
|---|---|---|
| DE | 102018004478 A1 | 11/2018 |
| EP | 1666318 A1 | 7/2006 |
| JP | 2011189896 A | 9/2011 |
| WO | 0142065 A1 | 6/2001 |

OTHER PUBLICATIONS

Chinese Office Action in connection to CN Application No. 201780095671.2, dated Oct. 11, 2021.

ISR in connection with PCT/DE2019/200136, dated Mar. 27, 2020.

* cited by examiner

INTEGRATED MOTOR RETRACTOR (IMR) WITH MOTION PROFILES

CROSS REFERENCE TO RELATED APPLICATIONS

This application is a national stage application filed under 35 U.S.C. § 371 of PCT International Application No. PCT/IB2017/000923, filed Aug. 7, 2017, which is hereby incorporated herein by reference in its entirety.

The invention relates to an active restraint system comprising a seat belt retractor, with a frame and a belt reel with a belt webbing wound thereon which is rotatably supported by the frame for allowing winding and unwinding the belt webbing. Moreover, the invention relates to a method for controlling an active restraint system of the afore-mentioned type.

In general, it is known to provide an active restraint system comprising a seat belt retractor with an electric motor for facilitating different functions. For example from DE 199 27 731 C2, it is known to provide a seat belt retractor with electric motor for adjusting the force of the retraction spring, for facilitating a comfort function. An electric motor which is relatively flat in its dimensions is disclosed in DE 43 02 042 C2 is mounted against the frame of the seat belt retractor such that a rotor of the electric motor is coupled with an radial outer end of the retraction spring, and thus is able to adjust the force acting on the belt reel. When the rotor is rotated such that the spring is unwound, the force acting on the belt webbing is lowered and thus, comfort is increased. DE 199 27 731 C2 moreover discloses that a switchable clutch can be provided between the rotor of the electric motor and the belt reel, such that in a pre-crash situation the torque of the electric motor may be directly supplied to the belt reel for pretensioning the belt webbing. A drawback of this seat belt retractor is that only two functions (comfort function and pretensioning function) can be carried out.

A further active restraint system is known from DE 197 31 689 C2, in which a seat belt retractor is provided with an electric motor as well. Again the electric motor may be designed according to DE 43 02 042 C2. According to DE 197 31 689 C2 the electric motor is connected to a shiftable transmission gear. Depending on how the transmission gear is shifted, the torque of the electric motor can be supplied for adjusting the force of the retraction spring, or supplied to a mechanism for adjusting a load limiter, or supplied directly on the belt reel for pretensioning a belt webbing in pre-crash situation.

However, a drawback of the arrangement disclosed in DE 197 31 689 C2 is that the construction is rather complex and also space consuming leading to a cost intensive manufacturing and also error susceptibility.

Therefore, an object of the present invention is to further improve an active restraint system comprising a seat belt retractor having an electric motor attached thereto to even further increase comfort and safety for the passenger.

According to the first aspect of the invention, this problem is solved by an active restraint system comprising a seat belt retractor with an electric disc motor comprising a rotor and a stator, the rotor being directly attached to the belt reel, and a control unit connected to the disc motor and adapted to control the disc motor to drive the belt reel in accordance with a determined belt motion profile. Said seat belt retractor comprises a frame and a belt reel with a belt webbing wound thereon which is rotatably supported by the frame for allowing winding and unwinding the belt webbing.

Such a disc motor is a specific type of a motor having a disc shaped rotor and a stator having a corresponding disc shaped slot in which the disc shaped rotor is received. The rotor comprises a rotor shaft which may be directly coupled to the belt reel. The rotor may be coupled to the body of the belt reel itself, in particular to an extension of the belt reel. Alternatively the rotor may be coupled to a torsion bar provided within the belt reel. Preferably, the disc motor comprises a rotor with a plurality, e.g. two, three or four rotor discs. Preferably, the disc motor is formed by the torque disc motor and adapted to supply a relatively large torque. While the prior art electric motor, as e.g. disclosed in DE 199 27 731 C2 is connected to the belt reel via a planet gear, according to the present invention, the rotor is directly attached to the belt reel and thus, it is preferred to supply a high torque with a lower speed.

Such a disc motor may comprise at least one air-core coil. The motor in general may be formed as disclosed in WO 00/30238 A1 or DE 101 37 201 A1. The rotor discs preferably are provided with a meander winding, which preferably is provided as a printed conductor path on a substrate of the rotor discs. Since the rotor does not comprise a coiled winding, the response time of the motor is short and safety can be improved. Preferably the air gap between the rotor and the stator is in the range of 0.1 mm or less.

The term directly attached in this instance means that no gearing or switchable clutch is provided between the rotor and the belt reel. The rotor may be formed integrally with the belt reel or connected the belt reel by means of a fixed clutch.

The control unit preferably comprises determination means for determining the belt motion profile. Such determination means may be formed of or comprise a software module carried out by a micro controller. The belt motion profiles define a time-traverse graph for the belt webbing.

According to a first preferred embodiment the active restraint system comprises a belt reel position sensor for measuring the rotational position of the belt reel, wherein the control unit is connected to the belt reel position sensor and adapted to determine the belt motion profile based on the measured belt reel position. The belt reel position sensor may be formed as a separate sensor element, e.g. a sensor measuring the thickness of the webbing wound on the belt reel, or also may be provided as a software module in the control unit and adapted to determine the belt reel position based on current induced by rotating the rotor of the disc motor. Such a belt reel position sensor is helpful for determining out-of-position of the passenger, a passenger size or child seat detection. Based on the determined belt reel position it is known how much webbing is on the belt reel and how much webbing is taken off. Thus, the size of the passenger can be inferred, and out-of-position position of the passenger, or the presence of a child seat can be inferred.

When the respective seat to which the seat belt retractor is assigned, is an adjustable seat e.g. adjustable in a longitudinal direction of the respective vehicle, the control unit of the seat belt retractor preferably is provided with seat position data, so that the relative position of the belt retractor and the respective seat can be taken into account when determining the passenger size, out of position, and/or a child seat. Based on these determined positions the respective belt motion profile can be determined. E.g. when an out-of-position position of the passenger is determined, it is preferred that the belt motion profile is chosen such that the passenger is moved back to the desired position. When e.g. a child seat is determined the belt motion profile is deter mined such that no pretensioning is performed in a pre-crash situation since this would be vulnerable for the child seat.

Preferably the active restraint system comprises a velocity sensor for measuring the rotational velocity of the belt reel, wherein the control unit is connected to the belt reel velocity sensor and adapted to determine the belt motion profile based on the measured belt reel velocity. Such a belt reel velocity sensor in particular is useful in view of a comfort function to support the passenger and permit the webbing to unreel with a desired velocity or to wind up the belt reel with a desired velocity. Also such a belt reel velocity sensor is beneficial in crash situation to determine the velocity of the displacement of the passenger. When the passenger is relatively light, e.g. a five percentile female passenger, a load limiter might be not optimal constructed for such a person and the deceleration of the person is too high, which may result in injuries. The belt reel velocity sensor detects such a velocity, which is too low, and the control unit is adapted to determine a respective belt motion profile to support this displacement of the person in the crash situation. The electric motor is accordingly controlled, such that it acts to unwind belt webbing to permit the person to displace in the desired manner. In the other way around, when it is determined that the displacement velocity of the person in a crash situation is too high, the electric motor acts on the belt reel to reduce the velocity. This improves safety of the safety restraint system and provides an actively controlled seat belt retractor.

Moreover, it is preferred the active restraint system comprises a belt reel torque sensor for measuring a torque applied on the belt reel by means of the belt webbing, wherein the control unit is connected to the belt reel torque sensor and adapted to determine the belt motion profile based on the measured belt reel torque. This can be in alternative or in addition to the before-mentioned preferred embodiment comprising the belt reel velocity sensor.

According to a further preferred embodiment, the control unit is connected to a vehicle control system and adapted to determine the belt motion profile based on at least one sensor value received from the vehicle control system. Such sensor values may be values provided by a pre-crash sensor, accelerometers, passenger sensors, as e.g. sleep detection, ACC (Adaptive Cruise Control)-sensors, ESE (Electronic Stability Control)-sensors and the like. For example, when a passenger sensor detects a passenger is under the risk of sleep, the control unit preferably is adapted to control the electric motor such that the belt webbing is tighten for a short period, for giving the passenger a signal to wake up again. This improves safety of the safety restraint system and provides an actively controlled seat belt retractor.

Furthermore, preferably the control unit comprises a memory unit in which a plurality of pre-defined belt motion profiles is stored, and wherein the control unit is adapted to determine the belt motion profile by electing the belt motion profile from the stored plurality of pre-defined belt motion profiles. The control unit may be provided with information from a vehicle control system and receives passenger identity data, e.g. via an interior camera, a key associated with the person, a card reader reading a personal card, e.g. as a driving license, or the like. Such pre-stored and pre-defined belt motion profile may be defined by the passenger itself, e.g. in view of comfort aspects. Addition-ally or alternatively, such pre-defined belt motion profiles for specific groups of persons, as e.g. age, weight, gender, body dimensions and the like.

Moreover, preferably the control unit comprises a memory unit in which a plurality of pre-defined parameters are stored, and a calculating unit for calculating the belt motion profile based on at least of the stored parameters. Each parameter may be associated with specific belt motion profiles or calculating rules for belt motion profile. Based on this parameter the respective belt motion profile can be calculated. Examples for parameters include but are not limited to passenger ID and passenger weight.

According to a further preferred embodiment, the seat belt retractor may optionally comprise a load limiter for limiting the belt webbing load in a crash situation, wherein the control unit is adapted to control the disc motor such that substantially the whole range of the load limiter is consumed or used. This is preferably done according to a pre-defined belt motion profile. The belt motion profile is determined such that in a crash situation the load limiter is substantially fully consumed or used in an optimal manner (i.e. fully twisted) and the control unit controls the electric motor such that the belt webbing is moved in accordance with this belt motion profile. This includes acting in addition, and/or against (subtractive to) the load limiter, dependent on the crash situation and dependent on passenger characteristics. Preferably the load limiter is formed as a torsion bar. Such torsion bars in general are not adjustable and usually designed to suit the 95 percentile male person. The motor thus can act in an additive or a subtractive manner to the load limiter, in particular torsion bar, to enable an increase in safety.

Furthermore, it is preferred that in a crash situation the control unit is adapted to control the electric motor after a first impact to tighten the belt webbing. In seat belt retractors as known in the state of the art, the belt webbing is relatively loose after the first impact, since the passenger has displaced to the front and consumed the load limiter. When a second impact occurs, the passenger is not held in place by the belt webbing which may result in severe injuries. According to the invention, the control unit is adapted to control the motor to tighten the belt webbing after the first impact and to pull the passenger back in the normal position. Thus, safety can be increased.

In a further preferred embodiment, the seat belt retractor comprises a mechanical blocking unit with a mechanical vehicle sensor, and a de-activation device for de-activating the vehicle sensor. Preferably the de-activation device is only active for de-activating the vehicle sensor, when the electric disc motor is active. The control unit preferably is adapted to receive acceleration signals from a vehicle control system and to supply a respective torque to the belt reel for fixing the belt reel, when the acceleration exceeds a predetermined threshold. Thus, the control unit substitutes the function of the mechanical vehicle sensor, and thus it is possible to de-activate the mechanical vehicle sensor. This may increase the comfort for passenger, since the mechanical noise generated by the sensor mass of the mechanical vehicle sensor is suppressed.

Moreover, in this embodiment preferably the deactivation device comprises a solenoid for engaging a moving member of the vehicle sensor. The moving member preferably is a sensor mass e.g. a ball of the vehicle sensor, as it is generally known in the prior art. Such a solenoid has the benefit that when no electric energy is delivered (the solenoid is de-activated) and the mechanical vehicle sensor is activated again. This increases safety. In case the energy supply system of the vehicle experiences an error and the electric disc motor is not active, the mechanical vehicle sensor automatically is activated again. This leads to a fail safe system. Alternatively, also an electric motor with an eccentric output shaft can be used. The eccentric output shaft engages the moving member to fix it and when no current is supplied to the motor, the rotor of the motor can be moved by the sensor mass so that the sensor mass is in a movable state again.

According to a second aspect of the invention a method for controlling an active restraint system of at least one of the beforehand described preferred embodiments of an active restraint system is provided, the method comprising the steps: receiving at the control unit a signal representing a first condition; determining a first belt motion profile; and controlling the disc motor such that the belt reel is moved according to the first belt motion profile. It shall be understood that the active restraint system according to the first aspect and the method for controlling an active restraint system according to the second aspect of the invention comprise similar and identical preferred embodiments as in particular defined in the dependent claims. Insofar reference is made to the above description of the active restraint system according to the first aspect of the invention.

According to a preferred embodiment of the method, the first condition is or comprises a vehicle condition. A vehicle condition in particular is an acceleration of the vehicle, a crash situation of the vehicle or the like. One possible belt motion profile according to such an embodiment is that the disc motor is controlled to rotate the belt reel in the wind-up direction to tighten the belt webbing for a short time after a latching signal is received, indicating that a tongue attached to the belt webbing has been latched in the respective seat belt buckle. Belt slack is removed and the belt webbing subsequently brought into a comfort position. The latching signal is a signal indicating a vehicle condition.

Alternatively or additionally, when the control unit receives a signal that the vehicle should be driven to a service garage, the disc motor is controlled to move the belt reel in an oscillating manner for reminding the passenger that a problem exists in the car. A further belt motion profile would be tensioning the belt webbing, when a crash signal is received.

According to a further preferred embodiment of the method, the first condition is or comprises a passenger condition. In such an embodiment for example, when the control unit receives a signal indicating that the passenger is in an out-of-position position, the disc motor is controlled to pull the passenger back into a normal position.

Furthermore, it is preferred that the method comprises the steps: receiving at the control unit a signal representing a second condition; determining a second belt motion profile; and controlling the disc motor such that the belt reel is moved according to the second belt motion profile.

Particularly preferred the method comprises the steps: detecting a first impact in a crash situation; and controlling the disc motor such that the belt is tightened after the first impact.

For more complete understanding of the invention, the invention will now be described in detail with reference to the companying drawings. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and is claimed hereinafter. Further the features described in the description, the drawings and the claims disclosing the invention may be essential for the invention considered alone or in combination. In particular, any reference signs in the claims shall not be construed as limiting the scope of the invention. The word "comprising" does not exclude other elements or steps. The wording "a" or "an" does not exclude a plurality. The wording "a number of items", comprises also the number 1, i.e. a single item, and further numbers like 2, 3, 4 and so far.

Figure 1:
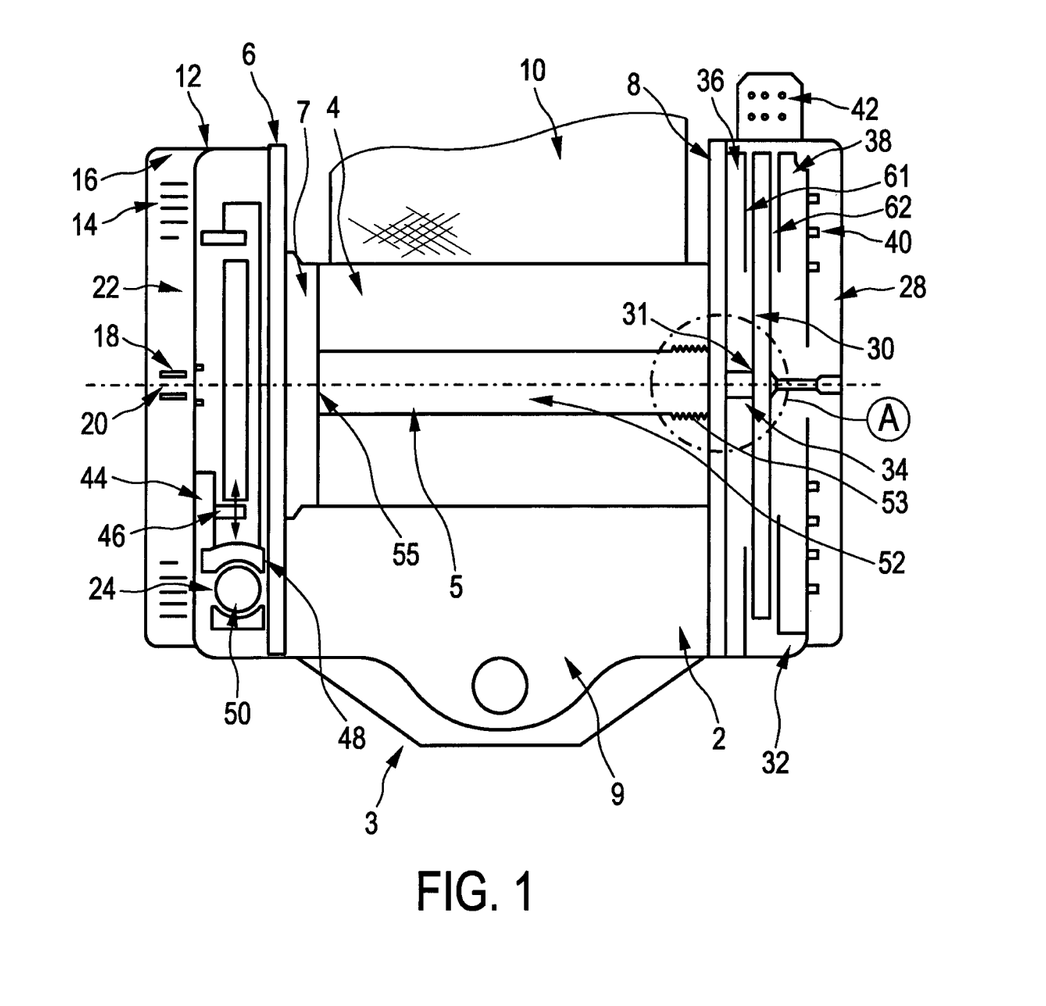
FIG. 1 is a partially cut of view of a seat belt retractor according to a first embodiment of the invention.

According to an aspect of the invention an active restraint system 1, comprises a seat belt retractor 3 with a frame 2 and a belt reel 4 with a belt webbing 10 wound thereon and rotatably supported by the frame 2 for allowing winding and unwinding the belt webbing 10, an electric disc motor 28 comprising a rotor 30 and a stator 32, the rotor 30 being directly attached to the belt reel 4, and a control unit 40 connected to the disc motor 28 and adapted to control the disc motor 28 to drive the belt reel 4 in accordance with a determined belt motion profile. The frame 2 comprises two side walls 6, 8, in which the belt reel 4 is rotatable received, the side walls connected by a common wall or backwall 9.

On the left hand side of FIG. 1 in a casing 12 the so called mechanical part of the seat belt retractor 3 is provided comprising a retraction spring 14. The retraction spring 14 is supported with its radial outer end at the outer end 16 at the housing 12 and with its radial inner end 8 at an extension 20 of the belt reel 4 for biasing the belt reel 4 to retract the webbing 10.

In the casing 12 moreover a web sensor 22 and a vehicle sensor 24 are provided, as it is known in the prior art. The web sensor 22 acts to block the belt reel 4 when the belt webbing 10 is unwound with an excess acceleration or excess speed. In the same manner, the vehicle sensor 24 blocks the belt reel 4 when the vehicle experiences an excess acceleration. Both sensors, the web sensor 22 and the vehicle sensor 24, act on a mechanical basis, such that they are able to block the belt reel 4 even if the vehicle control system 300 (see FIG. 7) experiences a failure.

Within an inner hollow portion 5 of the belt reel 4 is a load limiter. In this embodiment, the load limiter is in the form of a torsion bar 52. The torsion bar 52 is attached via a fixed bearing 53 to the belt reel 4 on the right hand side of FIG.

1. On the left hand side at 55 the torsion bar 52 is not attached to the belt reel 4; the only portion of attachment to the belt reel 4 is at 53.

The illustrated active restraint system 1 in particular is useful for electric vehicles having a 240 Volt board network 340 instead of a 12 Volt board network as usual gasoline or diesel cars have.

As mentioned above (FIG. 1) the active restraint system 1 is provided with an electric disc motor 28 having a rotor 30 and a stator 32. The rotor 30 is in the form of a disc and directly attached at 31 to an axial extension 34 of the belt reel 4 and thus in torque transmitting relationship with the belt reel 4. It shall be noted that there is no clutch or transmission gear provided between the rotor 30 and the belt reel 4. The rotor 30 may be attached to the extension 34 by known shaft and hub connecting means 31, or by a weld line or the like. The rotor 30 may also be attached to the extension 34 by a clamping mechanism using a screw and a respective screw threaded bore in the extension 34. In so far, the extension 34 form a rotor shaft of the electric disc motor 28.

Figure 1A:
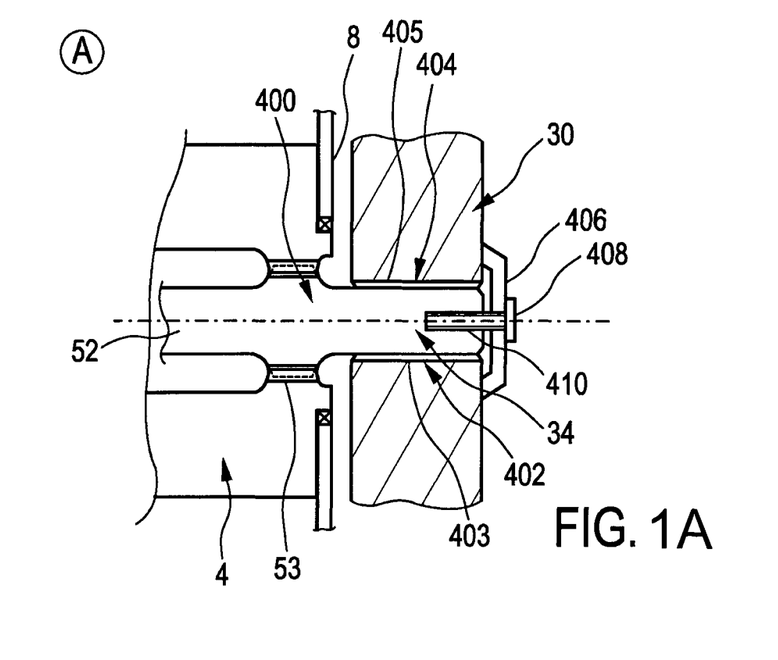
FIG. 1A the detail A of FIG. 1 in a first embodiment.
Figure 1B:
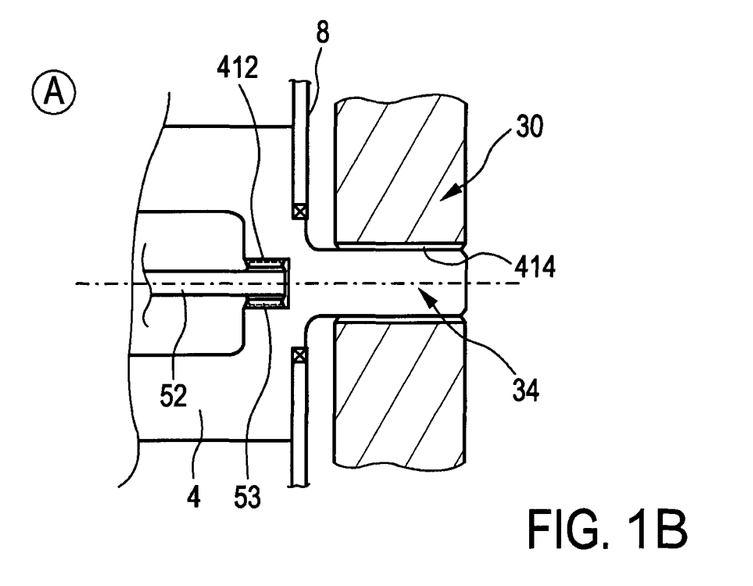
FIG. 1B the detail A of FIG. 1 in a second embodiment.

Two different embodiments of the connection between the rotor 30 and the extension 34 are shown in the details of FIGS. 1A and 1B. FIG. 1A illustrates an embodiment in which the extension 34 is formed at the load limiter 52. The load limiter 52 again is connected to the belt reel 4 via the fixed bearing 52 however extends in this embodiment (FIG. 1A) through an opening 400 of the belt reel 4. The extension 34 carries a first positive engagement section 402 in the form of a toothed outer circumferential surface 403 and the rotor 30 (in FIG. 1A simply shown as a block) comprises a second positive engagement section 404 in the form of a toothed inner circumferential surface 405. Rotor 30 engages the extension 34 by means of the corresponding inner and outer toothed circumferential surfaces 403, 405. This engagement inhibits a relative rotation of the rotor 30 to the extension 34. The cooperation of the two surfaces 403, 405 forms an attachment 31 of the rotor 30 to the extension 34.

An axial fixation is provided by a clamp 406 which is tightened against the rotor 30 by a screw 408 extending through said clamp 406 and being received in a screw threaded bore 410 of the extension 34.

According to the embodiment illustrated in FIG. 1B the extension 34 is directly formed with the belt reel 4. The belt reel 4 comprises an inner axial recess 412 in which the load limiter 52 is received and connected to belt reel 4 by said fixed bearing 53. Again, the rotor 30 is seated on the extension 34. According to this second embodiment (FIG. 1B) the rotor 30 is attached to the extension 34 via an attachment 31 which is a press fit 414 in this embodiment (FIG. 1B).

It shall be understood that the embodiments of FIGS. 1A and 1B also can be combined, in that e.g. the rotor 30 is attached to the extension 34 via a press fit in FIG. 1A, while in FIG. 1B the rotor 30 is attached to the extension 34 via the first and second positive engagement sections as described with reference to FIG. 1A.

Figure 4:
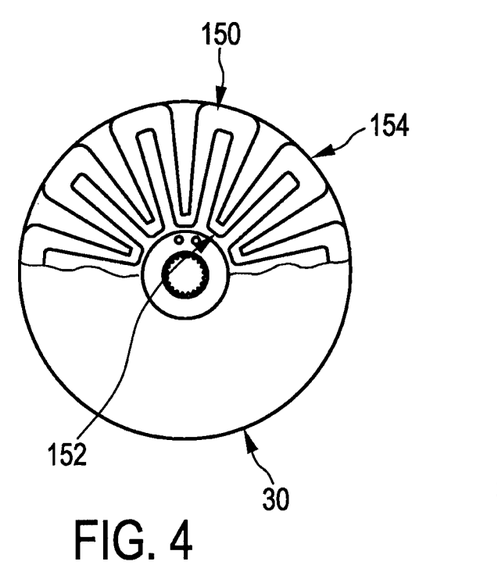
FIG. 4 is a schematic view of a rotor disc of the disc motor.
Figure 5:
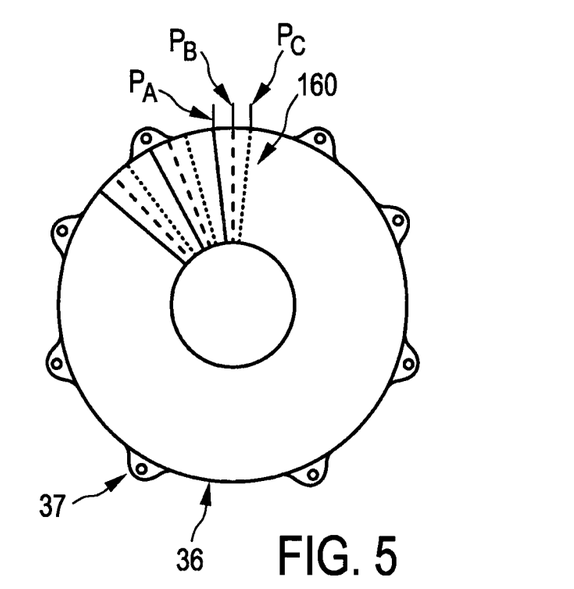
FIG. 5 is a schematic view of a stator disc of the disc motor.
Figure 6:
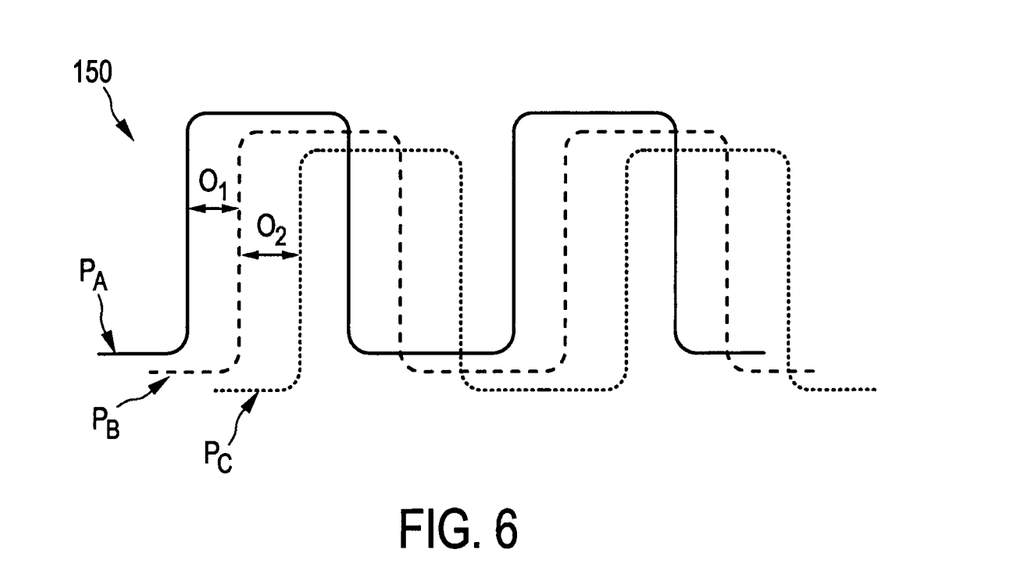
FIG. 6 is an illustrative diagram of a meander winding.

The stator 32 according to the embodiment of FIG. 1 is comprised of two stator plates 36, 38 which are connected to an energy supply 344 (see FIGS. 7 and 8) and comprise an electrical winding 160 (see FIG. 5). A corresponding winding 150 is provided on the disc 30 (see FIG. 4). When the stator 32 is supplied with energy, it produces an electric magnetic field inducing a corresponding current in the winding 150, which is preferably printed as a printed conductor path on the disc 30, thus again inducing an electric magnetic field. The two electric magnetic fields generate a magnetic force forcing the rotor disc 30 into rotation. This will be described in more detail based on FIGS. 2 to 6 below.

Between the disc 30 and the two stator plates 36, 38 gaps G1, G2 are provided which are relatively small, in particular in the range of 0.1 mm or less and might be that small that the stator plates 36, 38 contact the disc 30, when the motor 28 is not supplied with electrical energy. When the motor 28 is supplied with electrical energy, the electromagnetic fields causes the stator plates 36, 38 to move away from each other and thus form the gaps G1, G2.

Figure 7:
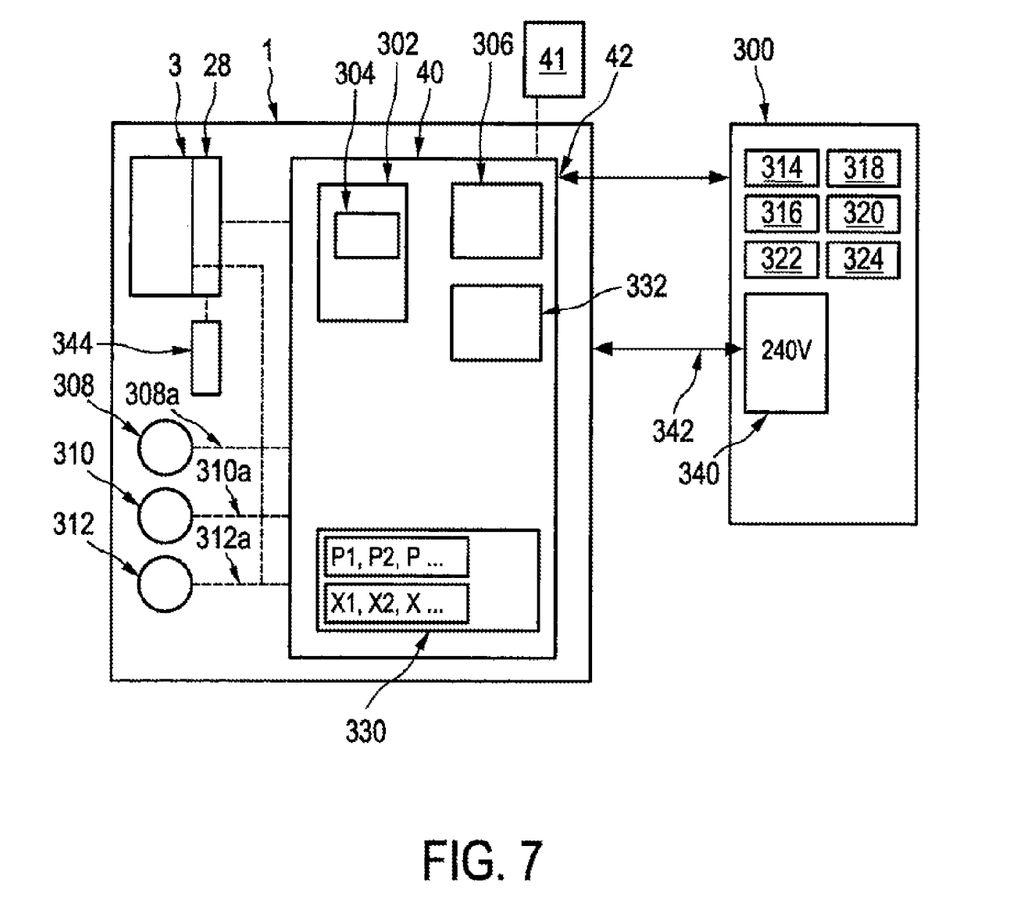
FIG. 7 is a schematic diagram of a vehicle control system connected to an active restraint system according to one embodiment.
Figure 8:
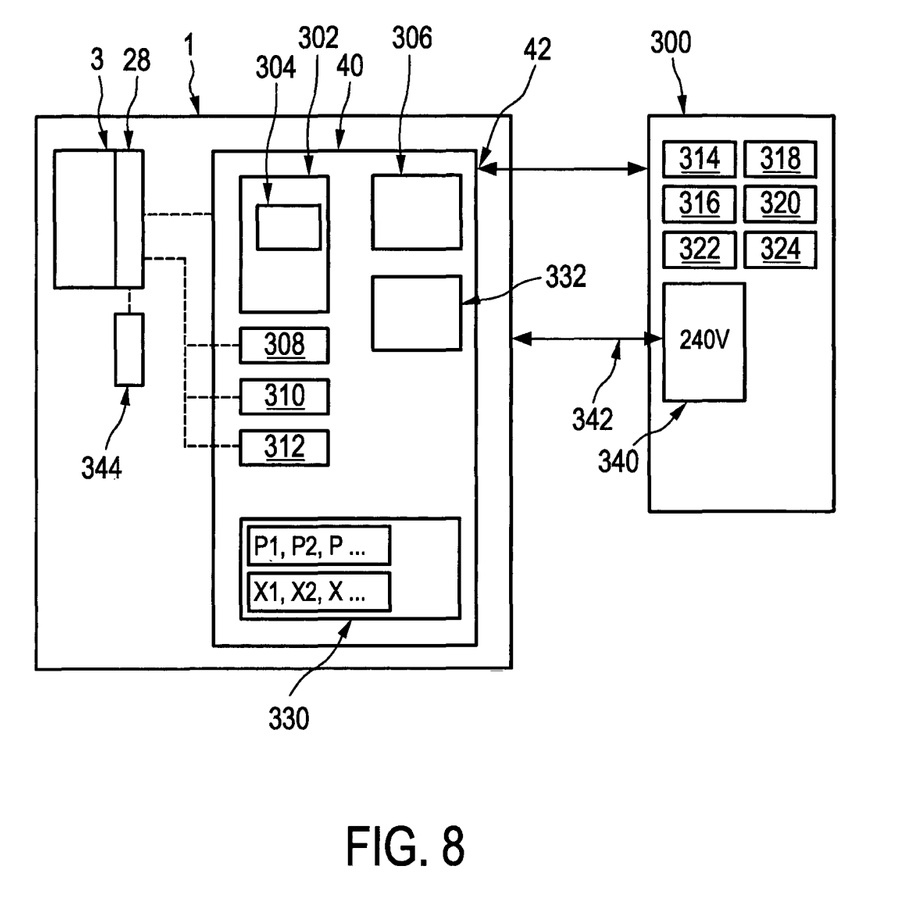
FIG. 8 is a second schematic diagram of a vehicle control system connected to an active restraint system according to another embodiment.

The active restraint system 1 moreover comprises a control unit 40 (see FIGS. 7 and 8). The control unit 40 is adapted to control the disc motor 28 to drive the belt reel 4 in accordance with a determined belt motion profile (see also FIGS. 7 to 11 below).

The active restraint system 1 also comprises a connector 42 for connecting the active restraint system 1 to a vehicle control system 300 for supplying the active restraint system 1 with electrical energy from the board network 340 and also with signals from the vehicle control system 300, such as passenger ID data, vehicle data and the like.

In the housing 12 of the mechanical side of the belt retractor 3 a de-activation device 44 is provided. The deactivation device 44 comprises a solenoid 46, which acts on a housing portion 48 of the vehicle 24 to clamp the sensor mass 50. This movement of the solenoid 46 is indicated in FIG. 1 by means of the arrow. The sensor mass 50 is formed as a ball, as known in the prior art. When the solenoid 46 is active, it pushes down the housing part 48 which engages the sensor mass 50. The sensor mass 50 is held fixed and the vehicle sensor 24 is de-activated. At the same time also noise generated by the sensor mass 50 is suppressed when the housing is depressed. This can be done, since the electric disc motor 28 can be used to block rotation of the belt reel 4, in that it provides a holding torque to the belt reel, which is high enough to block the belt reel 4 against unwinding of belt webbing 10.

Figure 9:
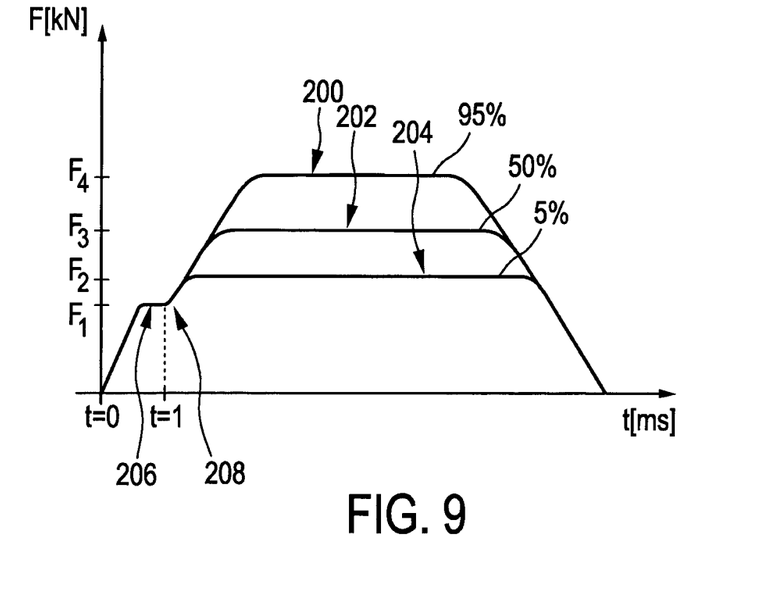
FIG. 9 is a belt motion profile according to the first embodiment.

As mentioned within the belt reel 4 a basic load limiter 52 in the form of a torsion bar is provided. This torsion bar 52 is designed to suit a 95 percentile male passenger. When it is determined that the passenger is on the respective seat is a lighter person, for example a 50 percentile male person or even a 5 percentile female passenger, a respective belt motion profile for a crash situation is determined by the control unit 40. Such a belt motion profile 200, 202, 204 is shown in FIG. 9 and described below.

Figure 2:
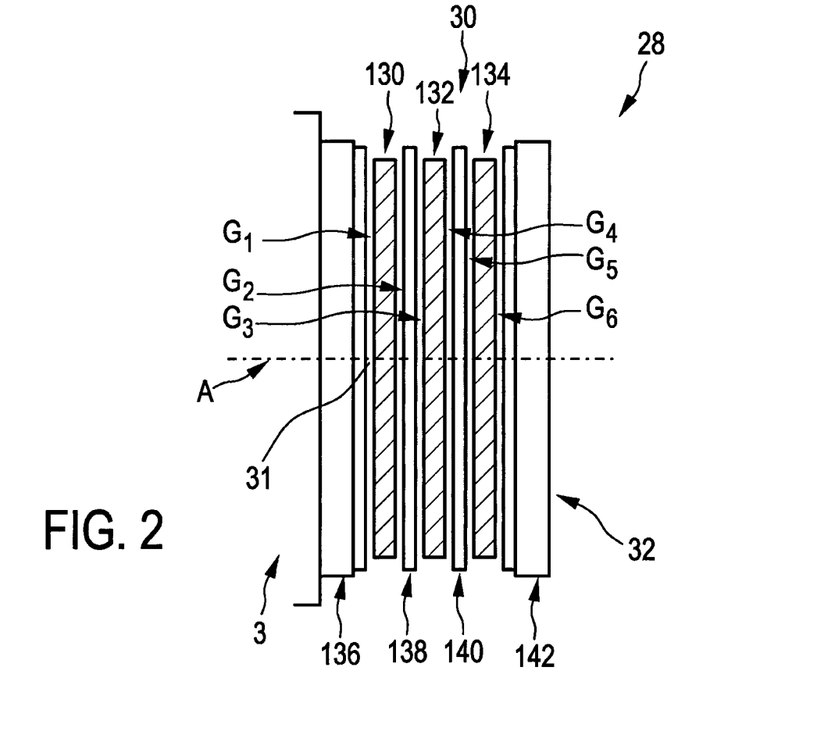
FIG. 2 is a cut view through an electric disc motor according to the invention.

FIG. 2 shows a second embodiment of an electric disc motor 28, having a rotor 30 and a stator 32. The rotor 30 according to this embodiment (FIG. 2) comprises three rotor discs 130, 132, 134, which are arranged sequentially with four stator discs 136, 138, 140, 142 of the stator 32. Between the single discs again gaps G1, G2, G3, G4, G5, G6 are provided. The rotor discs 130, 132, 134 are all arranged on a common axis A and attached to an axial extension 34 (see FIG. 1) for driving the belt reel 4 by an attachment 31 (see FIGS. 1A, 1B). It shall be understood that the disc motor 28 according to this embodiment (FIG. 2) can also be used with the active restraint system 1 as shown in FIG. 1. Using two or more rotor discs 130, 132, 134 enables the disc motor 28 to provide a higher torque. The number of discs can be chosen dependent on the respective type of use.

Figure 3:
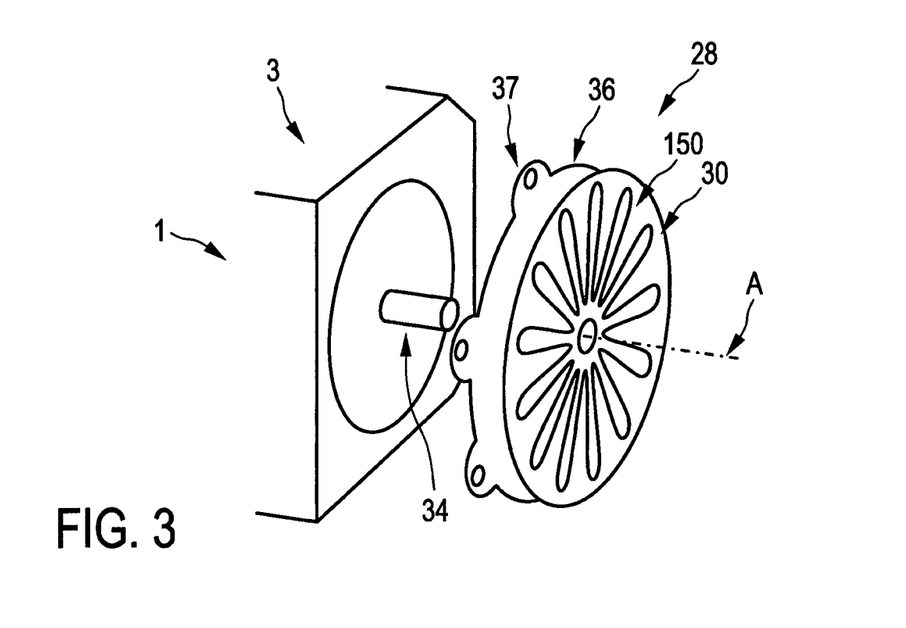
FIG. 3 is a partially exploded view of the disc motor.

With respect to FIGS. 3 to 6, the meander winding on 150 the discs 30, 130, 132, 134 is described. FIG. 3 shows a partially exploded view of the active restraint system 1 with the extension 34 protruding to the right hand side. For illustrative reasons, only one stator disc 36 and one rotor disc 30 are shown, even though it shall be understood that additional discs 130, 132, 134 (cf. FIG. 2 above) can be added and are provided with similar windings 150. The stator disc 36 comprises a fixing portion 37 for fixing, e.g. screwing, the stator disc 36 against a housing portion 8 of the seat belt retractor 1. The rotor disc 30 is provided with a meander winding 150 (see FIG. 4). The meander winding 150 (FIG. 4) runs in a meander shape from a radial inner portion 152 to a radial outer portion 154 to resemble the meander shape. The meander winding 150 comprises three phases $P_a$, $P_b$, $P_c$ (see FIG. 6), which are slightly offset to each other by offset O1, O2. Even though, the meander winding 150 is shown arranged in a straight way in FIG. 6, this meander winding is provided on the rotor disc 30 in a circular manner, as can be seen in FIG. 4. The meander winding 150 is provided by means of etching or printing on the rotor disc 30. All other rotor discs, 130, 132, 134 are formed in the same manner.

The stator disc 36 (see FIG. 5) is provided with a winding 160, which comprises the same three phases $P_a$, $P_b$, $P_c$, which are sequentially supplied with current to induce a moving electromagnetic field. This electromagnetic field induces a corresponding electromagnetic field in the meander winding 150 and thus, the rotor disc 30 is forced in rotation.

FIG. 7 shows a schematic block diagram of the active restraint system 1 connected to a vehicle control system 300.

The control unit 40 preferably comprises determination means 302 for determining the belt motion profile. Such determination means may be formed of or comprise a software module 304 carried out by a micro controller 306. The determination means 302 can be adapted to determine the belt motion profile by selecting a pre-stored belt motion profile (as it is described below), and/or to determine the belt motion profile by calculating a belt motion profile based on a plurality of parameters (as it is described below).

According to an embodiment the active restraint system 1 comprises a belt reel position sensor 308 for measuring the rotational position of the belt reel 4, wherein the control unit 40 is connected to the belt reel position sensor 308 via signal line 308a and adapted to determine the belt motion profile based on the measured belt reel position. The belt reel position sensor 308 in this embodiment (FIG. 7) is formed as a separate sensor element, e.g. a sensor measuring the thickness of the webbing 10 wound on the belt reel 4. Such a belt reel position sensor 308 is helpful for inferring out-of-position of the passenger, a passenger size or child seat detection. Based on the determined belt reel position, it is known how much webbing 10 is on the belt reel 4 and how much webbing is taken off i.e. unwound. Thus, the size of the passenger can be estimated and out-of-position position of the passenger, or the presence of a child seat can be inferred.

In case the respective seat to which the active restraint system 1 is assigned, is an adjustable seat e.g. adjustable in a longitudinal direction of the respective vehicle, the control unit 40 preferably is provided with seat position data, so that the relative position of the belt retractor and the respective seat can be taken into account when determining the passenger the above information as in particular passenger size, out of position, and/or a child seat. Preferably such information is taken into account when determining the belt motion profile.

Preferably the active restraint system 1 comprises a velocity sensor 310 for measuring the rotational velocity of the belt reel 4, wherein the control unit 40 is connected to the belt reel velocity sensor 310 via a signal line 310a and adapted to determine the belt motion profile based on the measured belt reel velocity. Such a belt reel velocity sensor 310 in particular is useful in view of a comfort function to support the passenger and permit the webbing 10 to unreel with a desired velocity or permit the webbing 10 to wind up with a desired velocity. Also such a belt reel velocity sensor 310 is beneficial in crash situation to determine the velocity of the displacement of the passenger. When the passenger is relatively light, e.g. a five percentile female passenger, a load limiter 52 might be not optimal designed for such a person and the deceleration of the person is too high, which may result in injuries. The belt reel velocity sensor 310 detects such a velocity, which is too low, and the control unit 40 is adapted to determine a respective belt motion profile to support this displacement of the person in the crash situation. The electric motor 28 is accordingly controlled, such that it acts to unwind belt webbing 10 to permit the person to displace in the desired manner. In the other way around, when it is determined that the displacement velocity of the person in a crash situation is too high, the electric motor 28 is controlled by controller 40 to act on the belt reel 4 to reduce the velocity. This may improve safety of the safety restraint system 1 and provides an actively controlled seat belt retractor 3.

Moreover, it is preferred the active restraint system 1 comprises a belt reel torque sensor 312 for measuring a torque applied on the belt reel 4 by means of the belt webbing 10, wherein the control unit 40 is connected to the belt reel torque sensor 312 via signal line 312a and adapted to determine the belt motion profile based on the measured belt reel torque. Also the torque sensor 312 can be used to measure displacement of a person in a crash situation and the control unit 40 is adapted to determine the belt motion profile for controlling the electric motor 28 based on the measured torque. This can be done by calculating the forward displacement based on a twist of the load limiter 52. The preferences of the load limiter 52 are known, and thus it is known how much the load limiter 52 will twist when a given torque is applied.

The control unit 40 is connected to the vehicle control system 300 and adapted to determine the belt motion profile based on at least one sensor value received from the vehicle control system 300. Such sensor values may be values provided by a pre-crash sensor 314, accelerometers 316, passenger sensors 318, as e.g. sleep detection 320, ACC (Adaptive Cruise Control)-sensors 322, ESE (Electronic Stability Control)-sensors 324 and the like. For example, when a passenger sensor 318 detects a passenger is under the risk of sleep, the control unit 40 preferably is adapted to control the electric motor 28 such that the belt webbing 10 is tensioned for a short period, for giving the passenger a signal to wake up again.

The control unit 40 comprises a memory unit 330 in which a plurality of pre-defined belt motion profiles P1, P2, etc. is stored. The control unit 40 is adapted to determine the belt motion profile P1, P2, etc. by selecting the belt motion profile P1, P2, etc. from the stored plurality of pre-defined belt motion profiles P1, P2, etc. The control unit 40 may be provided with information from a vehicle control system 300 and receives passenger identity data, e.g. via an interior camera 41, a key associated with the person, a card reader reading a personal card, e.g. as a driving license, or the like. Such pre-stored and pre-defined belt motion profiles P1, P2, etc. may be defined by the passenger itself, e.g. in view of comfort aspects. Additionally or alternatively, such pre-defined belt motion profiles P1, P2, etc. for specific groups of persons, as e.g. age, weight, gender, body dimensions and the like.

Preferably in the memory unit 330 a plurality of predefined parameters X1, X2, etc. are stored. The controller 40 comprises a calculating unit 332 for calculating the belt motion profile based on at least of the stored parameters X1, X2, etc. Each parameter X1, X2, etc. may be associated with specific belt motion profiles or calculating rules for belt motion profile. Based on the parameter X1, X2, etc. the respective belt motion profile can be calculated by means of the calculating unit 332. The processor 306 will then process the calculated belt motion profile and the controller 40 will control the disc motor 28 accordingly. Examples for parameters include but are not limited to passenger ID and passenger weight. The parameter may be pre-known or the parameter is being determined by the control unit 40.

FIG. 8 now shows a schematic diagram of an active restraint system 1 according to another embodiment of the invention. Identical and similar elements are provided with identical reference signs of the previously described embodiments, and insofar reference is made to the above description. In the following it is rather focused on the differences. If nothing is said regarding a specific element, the element is designed as defined above.

According to an embodiment the active restraint system 1 comprises a belt reel position sensor 308 for measuring the rotational position of the belt reel 4. The belt reel position sensor 308 is provided as a software module in the control unit 40 and adapted to determine the belt reel position based on current induced by rotating the rotor 30 of the disc motor 28. When the rotor 30 is rotated by means of pulling the webbing 10 causing a rotation of the belt reel 4, a current is induced in the stator winding 160, which can be measured. The current is indicative for the revolutions of the belt reel 4, and thus, based on this current, the belt reel position can be calculated. The controller 40 in this embodiment is adapted to calculate this position.

Moreover, in this embodiment (FIG. 8) the belt reel velocity sensor 310 is designed as a software module in the control unit 40 and adapted to determine the belt reel velocity based on current induced by rotating the rotor 30 of the disc motor 28. The principle of function is the same as it has been described with respect to the belt reel position sensor 308. Also the belt reel torque sensor 312 is designed as a software module in the control unit 40. Again, the same principles as above apply here.

Figure 10:
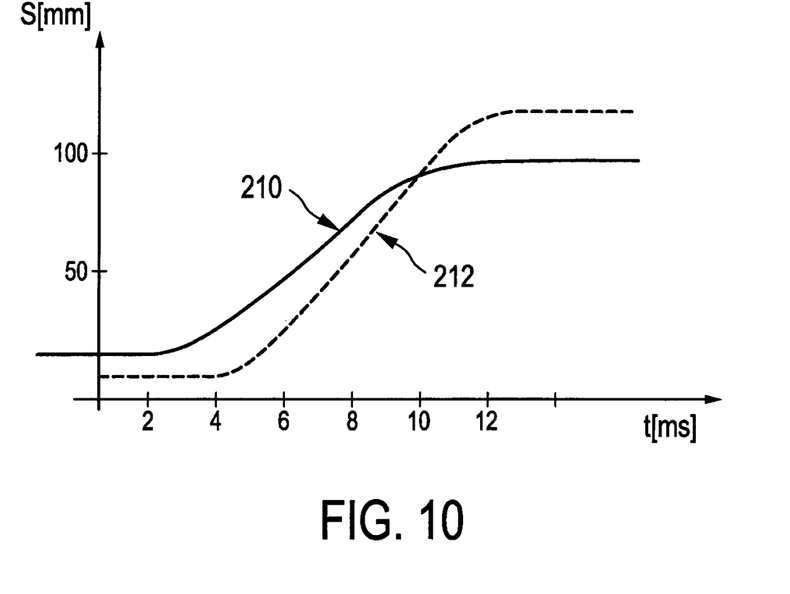
FIG. 10 is a belt motion profile according to a second embodiment.
Figure 11:
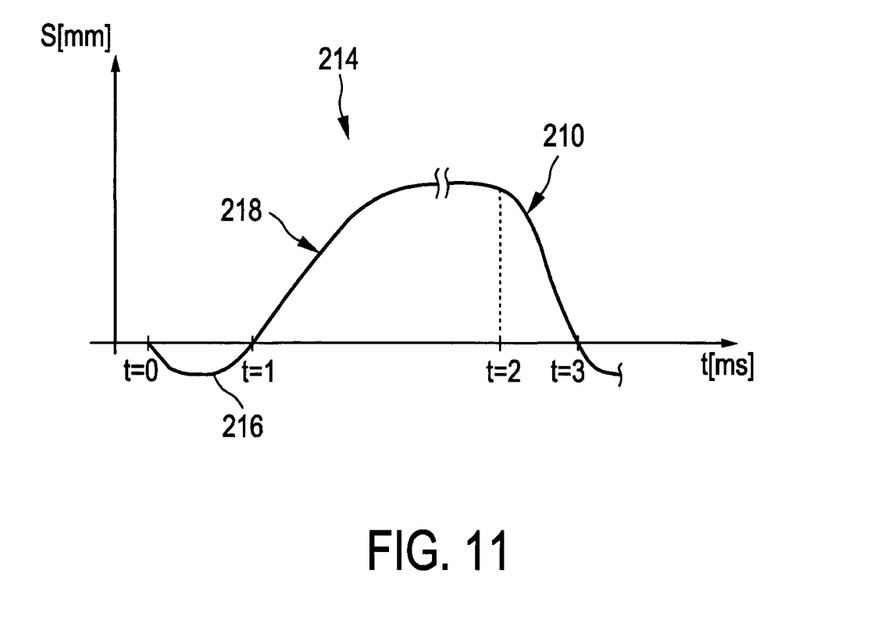
FIG. 11 is a belt motion profile according to a third embodiment.

With respect to FIGS. 9 to 11, three different embodiments of belt motion profiles are described. It shall be understood that a plurality of further belt motion profiles can be implemented, depending on the use case of the seat belt retractor.

According to FIG. 9, a force diagram is shown, wherein the force (F) in kilo Newton is shown on the ordinate axis and the time (t) in milliseconds is shown on the abscissa axis.

In FIG. 9, three graphs 200, 202, 204 are shown, which indicate the force acting on the seat belt or belt webbing 10 i.e. the retraction force for three different persons. Thus, each graph 200, 202, 204 define a specific belt motion profile. The graph 200 is dedicated for a 95 percentile male person, the graph 202 for a 50 percentile average person and the graph 204 for a 5 percentile female person. In this embodiment, it is assumed that the torsion bar 52 is an average torsion bar limiting the belt force to 4 kN. This might not be enough for tall persons and too much for short and light persons. When a crash situation occurs at t=O, in a first portion 206 of the load limiting operation, which is a belt pre-tightening only carried out by the disc motor 28 is provided. This pre-tightening is done until a force F1 is reached. At t=1, the load limiting operation twisting the torsion bar starts. Now, the three different graphs 200, 202, 204 indicate the respective force levels F2, F3, F4. For an average person (graph 202) no additional torque supply of the disc motor 28 is needed. The load limiting operation for force F3 is only carried out by means of the torsion bar without addition of force provided by the disc motor 28. When a 95 percentile male person is detected on the seat, the disc motor 28 is controlled to add torque to the belt reel 4 causing the belt reel to rewind and thus adds force to the belt webbing. According to the present embodiment the disc motor 28 adds a torque resulting in additional 1.5 kN acting on the belt and thus force F4 in the diagram is obtained. In the same manner, when a 5 percentile female person is detected on the seat, the disc motor 28 is controlled so as to subtract force from the load limiter 52, in this case −1.5 kN.

The respective belt motion profile represented by one of the graphs 200, 202, 204 is determined by the controller 40, in particular by the determination means 302, by selecting a suitable belt motion profile from the memory 330. The selection is carried out by using data from the belt reel position sensor 308 and optionally a weight sensor mounted within the respective passenger seat and also connected to the controller 40 or the vehicle control system 300.

Thus, in summary, when in the crash situation, the passenger is displaced by a forward force caused by the experienced deceleration. Due to the force acting on the blocked belt reel 4 via the belt 10, the torsion bar 52 is twisted for limiting the force acting between the belt and a passenger's body. When the passenger is lighter than a 95 percentile male person, the torsion bar 52 is dimensioned too stiff and thus as a consequence the torsion bar is not twisted enough and the forward displacement of the passenger is too short. For obtaining an optimal displacement and optimal twisting of the torsion bar 52, and in consequence an optimal load limiting result, the disc motor 28 is controlled by the control unit 40 such that it supports the forward displacement of the passenger, in that it adds torque to the belt reel 4, such that the torsion bar 52 is fully twisted. This may result in an improved forward displacement of the passenger which may increase safety and may reduce injuries.

FIG. 10 illustrates that the active restraint system 1 having the belt retractor 3 and the disc motor 28 according to the present invention can be used to carry out a full tensioning of the belt webbing 10 in a crash situation. The bold lined graph 210 illustrates the pulled-in belt webbing 10 on the ordinate in mm of webbing and the time scale in milliseconds on the abscissa axis. The dashed line illustrates a standard pyrotechnic belt tensioning mechanism, for comparison. Graph 210 in contrast indicates the movement of the belt 10 when only the disc motor 28 according to the invention is used in the active restraint system 1 without an additional pyrotechnical belt tensioning mechanism, as it is used in the state of the art. Graph 210 therefore represents a belt motion profile, which is selected by determination means 302, upon the controller 40 receiving a corresponding signal of a pre-crash-sensor 314 via the connection 42 to the vehicle control system 300.

It can be seen that the gradient of the graph 210 is lower than the gradient of the graph 212, however, it can also be seen that the tensioning operation using the disc motor 28 starts earlier at about 2 millisec, while the tension operation of the pyrotechnic belt tensioning apparatus starts at about 5 millisec. This is due to the fact that the disc motor 28 can react much faster than a pyrotechnic belt tensioning apparatus, which needs to be ignited first. Having a lower gradient is more comfortable for the person and thus also adds to the safety aspect of the active restraint system 1. Using the active restraint system according to the present invention makes it possible that no pyrotechnic belt tensioning device is needed anymore.

FIG. 11 shows a graph of a second impact control of the seatbelt retractor. The ordinate axis shows the length of the belt webbing 10 in mm, wherein values above zero show that belt webbing 10 is unreeled, i.e. the belt 10 is loosened, and values below zero show that belt webbing is retracted, i.e. tensioned. The abscissa axis shows the time T in milliseconds.

At t=0, a crash is detected and from t=0 until t=1 belt webbing is retracted (cf. Section 216 of the graph), such that a pretension operation is carried out. From t=1 on, belt webbing is unwound to allow the passenger being displaced to the front to be decelerated accordingly. In this section 218 also, the load limiter is twisted. At t=2, a second impact of the crash is detected. With normal state of the art seatbelt retractors, no additional action is possible now, since the load limiter 52 is already twisted. However, according to the present invention, the disc motor 28 is controlled again to carry out a belt tensioning operation; this is shown by section 220 of the graph 214. Belt webbing again is wound on the belt real and tensioned at t=3. A subsequent load limiting operation, similar to the graph section 218 can be carried out and supported by the disc motor 28 in a similar manner as described above. The disc motor 28 will be controlled to provide a respective torque, such that the passenger can be displaced forwards in a load limiting operation.

This belt motion profile according to FIG. 11 is stored in the memory 330 of the control unit 40 and is selected by the determination means 302 when the vehicle is in a crash situation and a respective signal is received from the vehicle control system 300.

Figure 12:
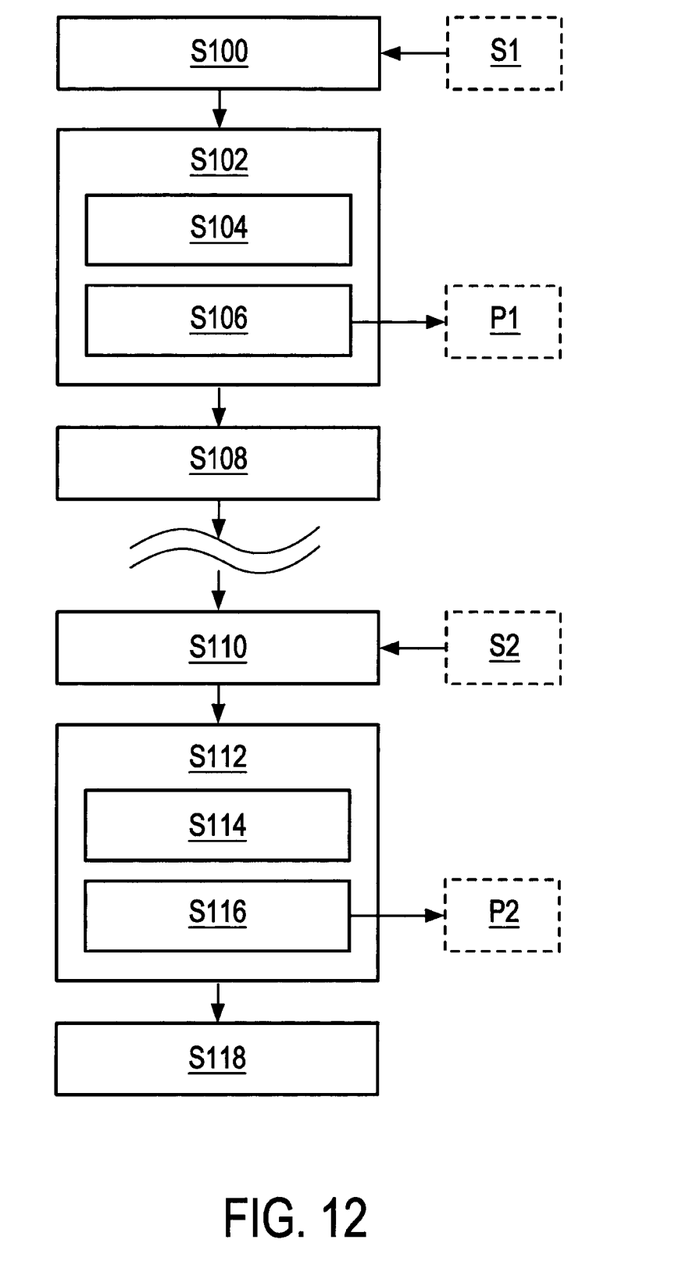
FIG. 12 is a schematic diagram of a method according to the invention.

Now FIG. 12 illustrated a method for controlling an active restraint system 1 of at least one of the beforehand described preferred embodiments of an active restraint system 1.

The method comprises the steps: receiving S100 at the control unit 40 a signal S1 representing a first condition; determining S102 a first belt motion profile P1; and controlling S108 the disc motor 28 such that the belt reel 4 is moved according to the first belt motion profile P1.

The first condition may be or may comprise a vehicle condition. A vehicle condition in particular is an acceleration of the vehicle, a crash situation of the vehicle or the like. One possible belt motion profile P1, P2, etc. according to such an embodiment is that the disc motor 28 is controlled to rotate the belt reel 4 in the wind-up direction to tension the belt webbing 10 for a short time after a latching signal of a seat belt buckle is received, indicating that a tongue attached to the belt webbing 10 has been latched in the respective. seat belt buckle. Belt slack is removed and the belt webbing 10 subsequently brought into a comfort position. The latching signal is a signal indicating a vehicle condition.

Alternatively or additionally, when the control unit 40 receives a signal that the vehicle should be driven to a service garage, the disc motor 28 is controlled to move the belt reel 4 in an oscillating manner for reminding the passenger that a problem exists in the car. A further belt motion profile P1, P2, etc. would be tensioning the belt webbing 10, when a crash signal is received.

The first condition may also be or comprise a passenger condition. In such an embodiment for example, when the control unit 40 receives a signal indicating that the passenger is in an out-of-position position, the disc motor 28 is controlled to pull the passenger back into a normal position.

According to FIG. 12, the step of determining S102 a belt motion profile comprises accessing S104 a memory 330 of the control unit, and selecting S106 from a plurality of pre-stored belt motions profiles P1, P2, etc. a suitable belt motion profile P1 based on the received S100 signal S1.

FIG. 8 also indicates that this process may be carried out continuously. Thus, the method comprises the steps: receiving S110 at the control unit 40 a signal S2 representing a second condition; determining S112 a second belt motion profile P2; and controlling S118 the disc motor 28 such that the belt reel 4 s moved according to the second belt motion profile P2. The second condition may be defined as stated above with respect to first condition. Again, also in these steps S110-S118, the step of determining S112 comprises accessing S114 the memory 330 of the control unit, and selecting S116 from the plurality of pre-stored belt motions profiles P1, P2, etc. the suitable belt motion profile P2 based on the received S110 signal S2.

The invention claimed is:

1. An active restraint system, comprising:
   a seat belt retractor, having a frame and a belt reel with a belt webbing wound thereon and rotatably supported by the frame for allowing winding and unwinding the belt webbing,
   an electric disc motor comprising a rotor and a stator, the rotor being directly attached to the belt reel, and
   a control unit connected to the disc motor and adapted to control the disc motor to drive the belt reel in accordance with a determined belt motion profile.

2. The active restraint system according to claim 1, comprising a belt reel position sensor for measuring the rotational position of the belt reel, wherein the control unit is connected to the belt reel position sensor and is adapted to determine the belt motion profile based on the measured belt reel position.

3. The active restraint system according to claim 1, comprising a belt reel velocity sensor for measuring the rotational velocity of the belt reel, wherein the control unit is connected to the belt reel velocity sensor and adapted to determine the belt motion profile based on the measured belt reel velocity.

4. The active restraint system according to claim 1, comprising a belt reel torque sensor for measuring a torque applied on the belt reel by means of the belt webbing, wherein the control unit is connected to the belt reel torque sensor and adapted to determine the belt motion profile based on the measured belt reel velocity.

5. The active restraint system according to claim 1, wherein the control unit is connected to a vehicle control system and adapted to determine the belt motion profile based on at least one sensor value received from the vehicle control system.

6. The active restraint system according to claim 5, wherein the vehicle control system comprises an interior camera, wherein the at least one sensor value received from the vehicle control system comprises occupant identity data.

7. The active restraint system according to claim 1, wherein the control unit comprises a memory unit in which a plurality of predefined belt motion profiles are stored, and wherein the control unit is adapted to determine the belt motion profile by electing the belt motion profile from the stored plurality of predefined belt motion profiles.

8. The active restraint system according to claim 1, wherein the control unit comprises a memory unit in which a plurality of predefined parameters are stored, and a calculating unit for calculating the belt motion profile based on at least one of the stored parameters.

9. The active restraint system according to claim 1, comprising a load limiter for limiting the belt webbing load in a crash situation, wherein the control unit is adapted to control the disc motor such that the whole range of the load limiter is consumed.

10. The active restraint system according to claim 1, wherein in a crash situation the control unit is adapted to control the motor after a first impact to tighten the belt.

11. The active restraint system according to claim 1, comprising a mechanical blocking unit with a mechanical vehicle sensor, and a deactivation device for deactivating the vehicle sensor.

12. The active restraint system according to claim 11, wherein the blocking device comprises a solenoid for engaging a moving member of the vehicle sensor.

13. A method for controlling an active restraint system according to claim 1, comprising the steps:
 receiving at the control unit a signal representing a first condition;
 determining a first belt motion profile; and
 controlling the disc motor such that the belt reel is moved according to the first belt motion profile.

14. The method according to claim 13, wherein the step of determining the first belt motion profile comprises: selecting the first belt motion profile from a set of stored belt motion profiles.

15. The method according to claim 13, wherein the first condition is a vehicle condition.

16. The method according to claim 13, wherein the first condition is a passenger condition.

17. The method according to claim 13, further comprising the steps:
 receiving at the control unit a signal representing a second condition;
 determining a second belt motion profile; and
 controlling the disc motor such that the belt reel is moved according to the second belt motion profile.

18. The method according to claim 13, further comprising the steps:
 detecting a first impact in a crash situation; and
 controlling the disc motor such that the belt is tightened after the first impact.

19. The active restraint system according to claim 1, wherein the rotor is directly attached to the belt reel via an axial extension of the belt reel.

20. The active restraint system according to claim 19, wherein the axial extension of the belt reel is directly attached to the rotor by a press fit or by a toothed engagement between teeth on an outer circumferential surface of the axial extension and teeth on an inner circumferential surface of the rotor.

* * * * *